United States Patent
Bassi (10) Patent No.: US 11,920,003 B2
(45) Date of Patent: Mar. 5, 2024

(54) METHOD FOR PROCESSING TEXTILE WASTE INTO RECYCLED PLASTIC GRANULE

(71) Applicant: KLEIDERLY GmbH, Berlin (DE)

(72) Inventor: Alina Bassi, Berlin (DE)

(73) Assignee: KLIEDERLY GmbH, Berlin (DE)

( * ) Notice: Subject to any disclaimer, the term of this patent is extended or adjusted under 35 U.S.C. 154(b) by 0 days.

(21) Appl. No.: 18/001,477

(22) PCT Filed: Jun. 11, 2021

(86) PCT No.: PCT/EP2021/065742
§ 371 (c)(1),
(2) Date: Dec. 12, 2022

(87) PCT Pub. No.: WO2021/250228
PCT Pub. Date: Dec. 16, 2021

(65) Prior Publication Data
US 2023/0227621 A1     Jul. 20, 2023

(30) Foreign Application Priority Data

Jun. 11, 2020  (EP) ..................... 20179584

(51) Int. Cl.
| | |
|---|---|
| *C08J 11/06* | (2006.01) |
| *C08J 3/00* | (2006.01) |
| *C08J 3/12* | (2006.01) |
| *C08J 3/20* | (2006.01) |
| *C08K 11/00* | (2006.01) |
| *B29B 9/06* | (2006.01) |
| *B29B 17/04* | (2006.01) |
| *B29K 105/26* | (2006.01) |

(52) U.S. Cl.
CPC .............. *C08J 11/06* (2013.01); *C08J 3/005* (2013.01); *C08J 3/12* (2013.01); *C08J 3/203* (2013.01); *C08K 11/00* (2013.01); *B29B 9/06* (2013.01); *B29B 17/0404* (2013.01); *B29B 2017/042* (2013.01); *B29B 2017/0484* (2013.01); *B29K 2105/26* (2013.01); *C08J 2323/00* (2013.01); *C08J 2367/02* (2013.01); *C08J 2367/04* (2013.01); *C08J 2401/02* (2013.01); *C08J 2467/00* (2013.01); *C08J 2475/02* (2013.01)

(58) Field of Classification Search
None
See application file for complete search history.

(56) References Cited

FOREIGN PATENT DOCUMENTS

| | | |
|---|---|---|
| CN | 105014824 | 11/2015 |
| CN | 110170502 | 8/2019 |
| CN | 110256752 | 9/2019 |
| CN | 110280565 | 9/2019 |
| EP | 3049563 | 8/2016 |
| EP | 3274493 | 1/2018 |
| WO | 2009/082350 | 7/2009 |

OTHER PUBLICATIONS

CN-110170502-A (Year: 2019).*
EP-3274493-A1 (Year: 2018).*
CN-110256752-A (Year: 2019).*
CN-105014824-A (Year: 2015).*
WO-2009082350-A2 (Year: 2009).*
EP-3049563-A1 (Year: 2016).*
CN-110280565-A (Year: 2019).*
Database WPI, Week 201975, Aug. 27, 2019 (Aug. 27, 2019), vol. 2019, No. 75, AN 2019-75305U, Thomson Scientific, London, GB.
Database WPI, Week 201985, Sep. 20, 2019 (Sep. 20, 2019), vol. 2019, No. 85, AN 2019-91574F, Thomson Scientific, London, GB.
Database WPI, Week 201612, Nov. 4, 2015 (Nov. 4, 2015), No. 12, AN 2015-765476, Thomson Scientific, London, GB.
Database WPI, Week 201983, Sep. 27, 2019 (Sep. 27, 2019), vol. 2019, No. 83, AN 2019-84886M, Thomson Scientific, London, GB.
Chris Kozicki et al.: "Pelletization Vs. Compaction Granulation", Feeco International, Oct. 30, 2018, pp. 1-11 available online at feeco.com.

* cited by examiner

*Primary Examiner* — Terressa Boykin
(74) *Attorney, Agent, or Firm* — JMB Davis Ben-David (57) ABSTRACT

The invention relates to a for recycling fabric into plastic granule for plastic manufacturing processes, the method comprising the steps of:
  a) Collecting fabric comprising fabric fibers
  b) Pulverizing the fabric into a powder of fabric particles
  c) Pelletizing the powder with a binder such that fabric pellets comprising the powder of fabrics are formed
  d) Extruding a mixture of the fabric pellets and a plastic compound into plastic granule.

16 Claims, 3 Drawing Sheets

METHOD FOR PROCESSING TEXTILE WASTE INTO RECYCLED PLASTIC GRANULE

CROSS-REFERENCE TO RELATED APPLICATIONS

This is the U.S. National Stage of International Patent Application No. PCT/EP2021/065742 filed on Jun. 11, 2021, which claims priority to European Patent Application No. 20179584.6 filed on Jun. 11, 2020.

The invention relates to a method for recycling fabric into plastic granule for plastic manufacturing processes.

The invention particularly relates to a method for turning clothing into a material that can be an alternative to plastic. The method allows to produce a plastic-like material in form of granule which can replace normal plastics in conventional plastic processing techniques, such as injection molding.

In face of an ever-growing global fabric waste, made of used textiles and remnants of fabric production and processing, there is a dire need of recycling the fabric waste in order to preserve the planets resources and to prevent environmental waste problems caused by said waste.

Moreover, reducing energy costs and the requirement of fossil fuels in plastic production is a particular concern in the plastic processing industry.

For example, in Germany the amount of used and disposed clothes amounts to about 1 billion tons per year. In case the disposed clothes cannot be reused directly, they often times end up in landfills and incineration facilities. Incineration of these clothes in turn might cost up to 200 EUR per ton. Moreover, burning these fabrics takes place at temperature above 100 degrees Celsius and leads to emission of harmful particles and gases. 87% of all clothing ends up in landfills and incinerators. Currently 100 billion garments are produced a year with this number predicted to double by 2050 to keep up with demands. Most clothing is now made from synthetic fibers which cannot decompose for over 200 years.

Therefore, there is a dire need of a recycling method for disposed clothes and fabrics in general.

In this context US 2016/0215421 A1 discloses a textile recycling method that granulates the textiles in particles add a binder agent and produce non-woven mats by means of a mat-pressing process.

While this method addresses the recycling of textiles the applicability of such a method in the plastic processing industry is very limited due to the limited possibilities offered by the mat-pressing process. Furthermore, mat-pressing cannot be scaled to an industrial level, which is a limiting factor of this method. Moreover, the textile waste has to be specified in terms of its composition. The method preferably uses cotton- or wool-only textiles, which in turn requires a sorting step, selecting only textiles of the right composition.

CN110256752A in turn discloses a method the produces plastic containing pellets from textile waste. For this purpose a heated mixture of a thermoplastic and a compatibilizing agent is sprayed on textile rags of several, particularly up to 10 square centimeters. With a kneader the sprayed and dried rags are then is pelletized into plastic containing pellets.

The extensive use of a compatibilizing agent and the elaborate method steps required to arrive at the final plastic granule, render this method energy consuming and potentially environmentally problematic due to the use of said compatibilzer. This method as well cannot be scaled to an industrial level.

Therefore, an objective of the invention is to overcome the problems in the art and to provide a sustainable, low-energy plastic producing process that provides plastic compatible for a wide variety of plastic processing applications.

This objective is achieved with the method according to claim 1.

Advantageous embodiments are described in the sub-claims.

According to a first aspect of the invention, a method for recycling fabric into plastic granule for plastic manufacturing processes comprises at least the steps of
  a) Collecting fabric comprising fabric fibers;
  b) Pulverizing, particularly fine milling the fabric into a powder of fabric particles;
  c) Pelletizing the powder with a binder such that fabric pellets comprising the powder of fabrics are formed;
  d) Extruding a mixture comprising at least the fabric pellets and a plastic compound into plastic granule comprising the fabric particles.

The method according to the invention allows for recycling fabrics, such as textile waste or fabric remnants accumulated in fabric or textile processing industries and provide a plastic granule comprising the recycled fabric, wherein said plastic granule can be further processed by conventional plastic processing methods to produce objects comprising the recycled plastic granule.

Moreover, collection of fabric is not limited to industrial fabric waste but can include the collection of used textiles such as denim or cloth that has been worn and disposed as waste. Furthermore, textiles may be collected from household goods, such as bedsheets, curtains and the like. The condition in which the clothes are in is of little to no concern.

The fabric can comprise all kinds of fabric fibers, but also non-fiber material such as metal or stone applications. Zippers and buttons might be comprised in the fabric as well. As long as these appliances are not made of plastic, they have to be removed.

The fabric can be clothing comprising or being made of cotton, viscose, elastane, nylon, wool and/or polyester, as well as blends of all of these and other materials.

The fabric can be collected from pre-consumer and post-consumer waste, to include rolls of fabric, unsold inventory of clothing, returned items, and even fabric cuttings.

Therefore, the collected fabric does not need to come at a certain size or shape. Particularly the composition of the fabric might be not known.

According to another embodiment of the invention, the method is devoid of a sorting step for sorting or selecting the fabric with respect to its fiber composition or size, particularly the method is devoid of a selection step with regard to cotton or wool composition.

According to another embodiment of the invention, the fabric might be washed or cleaned prior to further processing steps of the method.

In the pulverizing step, the fabric is pulverized or power shred in a fine fabric powder of fabric particles.

Particularly the fabric particles are devoid of a fiber structure and exhibit similar isotropic extension.

For pulverization, a fine grinder is used that is configured to produce fabric particles with a narrow particle size distribution.

For pulverization, the fabric might be dried beforehand.

According to another embodiment of the invention, the particle size of the fabric particles is adjustable, such that only particles having a selected maximum size are produced.

The term "fabric" particularly refers to fabrics comprising or consisting of woven and/or knitted fibers, or otherwise connected and knitted fibers.

The fabric can comprise fibers, wherein the fibers are selected from a plurality of materials, such as cotton, wool and synthetic, particularly plastic fibers.

In the pelletizing step the powder of fabric particles is formed into fabric pellets having a size of several millimeters to centimeters, particularly wherein the pellets have the same size.

The binder contains a binding agent.

In order to provide environmentally friendly fabric pellets only very little binder is used, particularly just enough so that the fabric pellets are stable for storage and transportation.

Particularly, the binder does not provide any chemically reactive compounds for polymerizing the fabric particles or to alter a chemical structure of the fabric particles.

Therefore, an inert binding agent can be used for forming the fabric pellets.

According to another embodiment of the invention, per kilogram fabric particles not between 50 and 500 milliliters, particularly between 100 and 250 milliliters, or 0.1 to 0.5 kilogram of binder, such as water are used for forming the pellets in the pelletizing step.

The pelletizing step may be performed at increased temperature between 30° C. and 100° C., particularly between 55° C. and 80° C.

For extruding the fabric pellets at least the plastic compound is added to the pellets so that a mixture comprising the fabric pellets and the plastic compound is formed.

The plastic compound is particularly a thermoplastic.

For extrusion the mixture is heated such that the plastic compound melts and a homogenous or semi homogenous material of the fabric particles and the plastic compound is formed.

For extruding the mixture into plastic granule an extruder is used.

The extruded plastic granule comprises the fabric particles, wherein the fabric particles are so small that the plastic granule, when processed further in a further processing step the device for said processing step is not clogged or compromised by the fabric particles in the fabric granule.

According to another embodiment of the invention, the plastic granule has a size in the range of 2 mm to 8 mm.

According to another embodiment of the invention, the mixture consists of the plastic compound and the fabric pellets.

According to another embodiment of the invention, the fabric is collected from a fabric collection facility, wherein the fabric either has been used and/or is a fabric remnant, particularly wherein the fabric has a composition with regard to its fiber materials.

This embodiment allows for a broad applicability of the method, as all kinds of fabric can be used with the method according to the invention.

A collection facility might be a commercial store, a storage warehouse, an industrial fabric or textile processing facility, a textile collection container for collecting textile waste from private households.

According to another embodiment of the invention, the method comprises the step of removing non-fiber compounds such as metal, ceramics and/or stone from the fabric prior to the extrusion step, particularly wherein the non-fiber compounds are removed after the pulverization step and/or before the pulverization step.

Non-fiber compounds such as metal, ceramics and stone might be comprised in the fabric in the form of appliances, zippers, rivets, buttons or other functional or design features of the fabric.

However, metal, ceramics and/or stone might lead to problems during the pulverizing step, in case the device for pulverization is sensitive to such hard compounds, and during the extrusion process and might damage the extruder. Moreover, these compounds might be unsuitable for further processing steps of the plastic granule.

According to one aspect of this embodiment, the non-fiber compounds are removed prior the pulverization step. This relaxes the specification requirements for a milling or grinding device. Removal might be done by cutting out these non-fiber compounds.

According to another or additional aspect of the invention, the non-fiber compounds are removed from the pulverized fabric. This allows for a blow-selection, a magneto-selective or other selection processes suitable for separating metal, stone or ceramics from the powder.

Furthermore, a sieving process that separate particles according to weight or size might be employed.

This embodiment allows for a greater degree of automatization of the method, as the non-fiber compounds do not need to be detected and cut-out in a separate, particularly manually executed step.

It is possible to execute the removal step before and/or after the pulverization, such that small or over-looked metal, ceramic or stone might be removed with great reliance after pulverization.

Ink and prints on the fabric are particularly not considered non-fiber compounds. Ink and prints can remain on the fabric for further processing steps.

According to another embodiment of the invention, the fabric is shred and/or cut-up, particularly mechanically into pieces prior to the pulverizing step, wherein the fabric pieces particularly have a size of several millimeters square, particularly several centimeters square, wherein non-fiber compounds such as metal, ceramics and/or stone are removed from the fabric pieces prior to the pulverizing step.

This embodiment allows for the use of a mill or shredder that is tolerant against the non-fiber compounds in the fabric, but that might not be able to pulverize the fabric to the fabric particles.

Removal of the non-fiber compounds can then be done in an automatic selection process, as disclosed above, such as an air blow selection process, a weight selection process a magnetic selection process.

According to this embodiment, the pulverization device does not need to be tolerant to said non-fiber compounds.

The term "tolerant" particularly means that the device is not damaged or broken when the non-fiber compounds are processed form the device.

According to another embodiment of the invention, the fabric particles have an average size of 1 mm or smaller than 1 mm. Particularly the fabric particles have an average size of 0.5 mm or smaller than 0.5 mm, particularly wherein the fabric particles have an average size of 0.4 mm or smaller than 0.4 mm, particularly wherein the pulverized fabric particles have a maximum size of 0.5 mm or smaller.

The size of the particle is particularly an outer diameter or an average diameter of the fabric particles.

According to another embodiment of the invention, the fabric particles have an average size between 0.01 mm and 0.4 mm, particularly wherein the pulverized fabric particles have a maximum size between 0.01 mm and 0.4 mm.

According to another embodiment of the invention, the powder does not contain particles that on average are larger than 1 mm, particularly not larger than 0.7 mm.

It could be shown that granule comprising fabric particles being smaller than 0.5 mm on average are well-suited for any other processing method. Larger particles in the granule might exhibit some problems in some processing methods.

Pulverizing the fabric to such a fine powder allows for any plastic processing method to process the plastic granule comprising the particles. If the particle size is larger, this property of the plastic granule cannot be guaranteed and thus applicability of the plastic granule for conventional plastic granule processing methods is limited.

According to another embodiment of the invention, the fabric comprises natural fibers, particularly wherein the fabric consists of up to 90% (weight percent) of natural fibers.

Particularly, natural fibers can be one or more of the following:

Cotton, silk, rayon, wool, hemp, linen.

According to another embodiment of the invention, the fabric comprises up to 100% synthetic fibers.

Synthetic fibers can be one or more of the following: Elastane, Polyester, Viscose, Nylon.

According to another embodiment of the invention, the fabric comprises fabric fibers or a mixture of fibers comprising:
- cotton,
- denim,
- wool,
- linen,
- hemp,
- silk,
- rayon,
- viscose,
- elastane, and/or
- polyester.

Particularly, the fabric comprises a mixture of natural and synthetic fibers.

According to another embodiment, the fabric comprises more synthetic fibers than natural fibers, particularly at least twice as much synthetic fiber than natural fiber in terms of weight percent.

This embodiment allows for plastic granule with superior properties as compared to plastic granule having a larger percentage of fiber particles from natural fibers.

According to another embodiment of the invention, the pulverization step is performed with a fine grinder and/or a fine mill, such as a fine grinding mill and/or a fine-cutting mill. Thus, the pulverization step is facilitated with a fine grinding or a fine milling method, particularly with a mechanical fine grinding or milling method.

It is noted the fine grinding and milling can be combined according to the invention. According to another embodiment of the invention, the powder is pelletized under pressure with the binder and particularly at temperature between 50° C. and 80° C.

This allows for forming mechanically stable pellets that can be transported and stored.

According to another embodiment of the invention, the binder comprises water, particularly with a sugar or roux, or wherein the binder consists of water.

This embodiment provides an environmentally friendly pelletizing step.

According to another embodiment the binder consists of an aqueous solution, particularly comprising an additional binder compound such as a sugar.

It is an important goal of the method to keep the amount of binder per kilogram fabric powder as low as possible, as for further processing steps the pellets should be comparably dry and also to preserve resources needed for the binder to a largest possible degree.

According to another embodiment of the invention, per kilogram fabric powder between 50 g to 500 g, particularly 100 g to 200 g of binder is added in the pelletizing step.

According to another embodiment of the invention, per kilogram fabric powder between 50 milliliters and 500 milliliters, particularly 100 milliliters and 200 milliliters of binder is added in the pelletizing step.

According to another embodiment of the invention, the mixture comprises at least 5% (wt) to 10% (wt), particularly at least 20% (wt), more particularly at least 30% (wt) of the fabric particles, more particularly up to 50% (wt), particularly wherein a rest of the mixture consists of the plastic compound and particularly a color agent.

According to another embodiment of the invention, the plastic compound is provided in form of pellets or granule to the mixture.

This embodiment allows for a precise composition of plastic compound and fabric pellets.

The fabric pellets and the plastic compound pellets are heated during extrusion and then form a homogenous or semi-homogenous material that is extruded to the plastic granule.

According to another embodiment of the invention, the plastic compound is a bioplastic compound comprising or consisting of polylactid acid (PLA), polyhydroxyalkanoates (PHA), or polybutylene succinate (PBS) or a mixture thereof.

This embodiment renders the method and the produced plastic granules particularly environmentally friendly and sustainable, as for example no fossil-oil-based plastic is used and comprised in the plastic granule.

The term bioplastic particularly refers to bio-based plastics that are based on re-growing natural resources, such as starch, cellulose, chitin, chitosan, lignin, casein, gelatine, plant oils.

In additional a bioplastic compound is particularly a plastic compound that is bio-degradable, i.e. the bioplastic compound can be decomposed within several years by microbes that are naturally occurring in nature.

As the fabric powder in case it is made from 100% natural fibers might also comprise decomposable natural fibers, such as cotton or linen, any product made by the plastic granule according to the invention, is a bio-degradable and thus environmentally sustainable product.

According to another embodiment of the invention, the plastic compound comprises low temperature processing thermoplastics, such as polyethylene terephthalate (PET) and/or a polyolefin, such as Polyethylene or Polypropylene.

Particularly, the low temperature processing thermoplastics is a recycled plastic, such as recycled PET or and/or a recycled polyolefin, such as Polyethylene or Polypropylene.

The term low-temperature processing thermoplastic particularly refers to a thermoplastic that melts below temperatures of 250° C.

According to another embodiment of the invention, the fabric comprises fabric of a selected color or a selected color composition only, such that a color of the extruded plastic granule is determined by the selected color or the selected color composition.

Sorting of the fabric based on a color or a color composition can be done automatically.

This embodiment allows for the selection of the plastic granule by means of selecting the color or a color composition of the fabric.

For example, when using predominantly dark colored fabric, a resulting plastic granule will have a dark color tone.

When selecting only bright colors or white fabric, the resulting plastic granule will be bright or white accordingly.

According to another embodiment of the invention, a color agent is added to the mixture, wherein the color agent is a dry organic material made from natural products, particularly from waste or remnants of edible food products, particularly wherein the color agent is or comprises scallop shells, grape seeds, such that the granule has a predefined color.

The color agent further may comprise one or more of the following materials: mussels, oyster, cork, algae and wood shavings.

This embodiment allows to produce plastic granules of a certain color or grain. Any product derived from such granule will appear in this color or grain.

Particularly, the color agent is provided in form of a powder or pellets to the mixture.

Therefore, according to another embodiment of the invention, the mixture consists of the plastic compound, the fabric pellets and the color agent only, allowing for an environmentally sustainable production of plastic granule with the method according to the invention.

According to another embodiment of the invention, the mixture is heated to a melting temperature for extrusion such that the plastic compound melts, particularly wherein a melting temperature of the mixture is below a pyrolysis or an oxidation temperature of the fabric particles.

This prevents the generation of any toxic gases or undesired side-effects on the plastic granule due to burnt fabric particles.

According to another embodiment of the invention, the mixture comprises up to 50% (weight percent), particularly up to 75% (weight percent) of the fabric pellets, particularly wherein a rest of the mixture consists of the plastic compound and particularly the color agent.

According to another embodiment of the invention, the plastic granule is injection molded, extrusion molded, injection stretch blow molded or additive manufactured such as three-dimensionally printed into a recycled plastic object comprising the fabric particles.

This embodiment disclosed a further processing step of the plastic granules, wherein said processing step is executed on conventional plastic processing devices without the need of modification, filtering or adapting the device to any specific property caused by the fabric.

Such recycled object can be used in automotive industry, furniture and/or packaging industry or any other plastic processing industry.

According to another embodiment of the invention, the fabric comprises is consists of used clothing and clothes.

According to another embodiment of the invention, the method is devoid of a use of a wetting agent.

According to another embodiment of the invention, the plastic granule is not mat-pressed in a further processing step.

According to a second aspect of the invention, a system for producing plastic granules with fabric is disclosed.

The system comprises a at least a fine grinder or mill, such a fine grinding mill for pulverization of the fabric, a pelletizer for pelletizing the fabric powder with the binder, an extruder for extruding the mixture into plastic granules.

Optionally the system further comprises a sorting device for sorting out non-fiber compounds such as metal, ceramics or stone form the fabric powder, particularly wherein the sorting device comprises a magnetic-selective sorting device, a blow-selection device and/or a sedimentation device for separating the non-fiber compounds from the powder.

The system further may comprise a feeder configured and adapted to add the color agent to the extruder.

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

Figure 1:
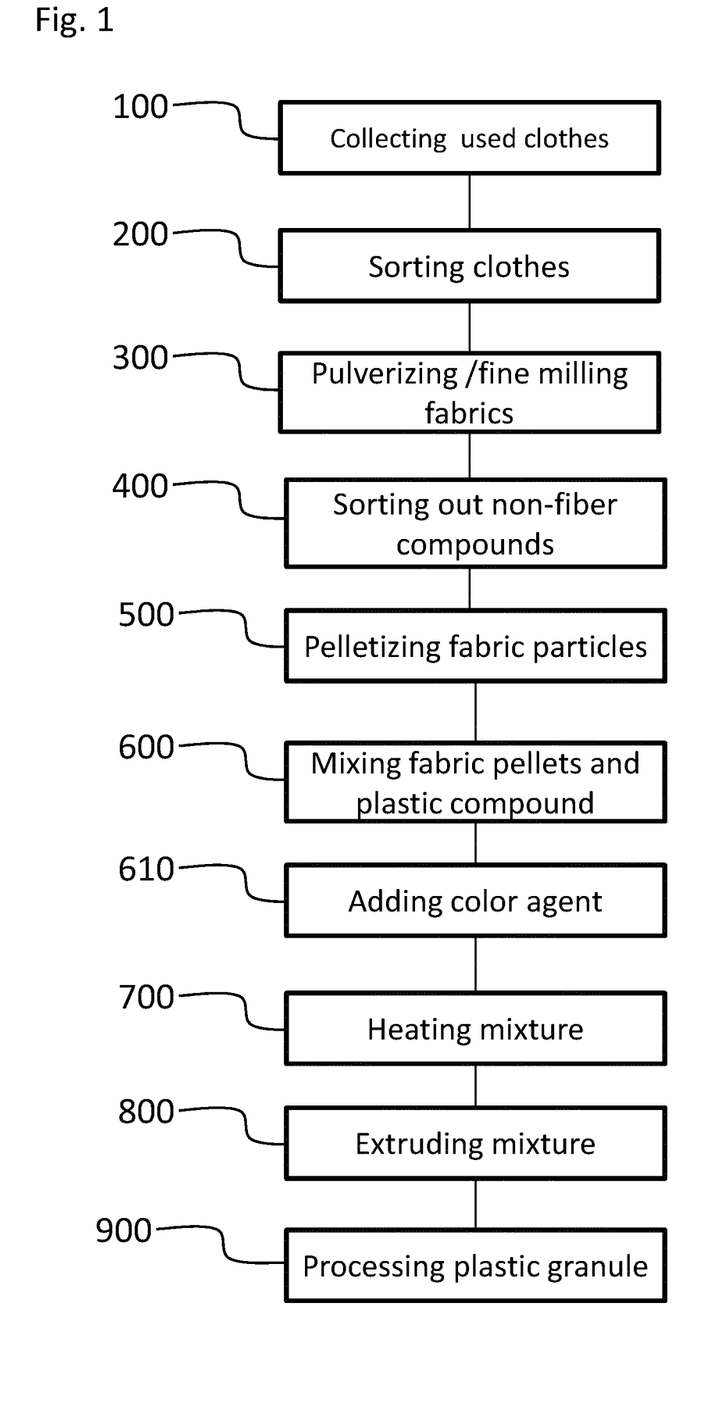
FIG. 1 shows a flow diagram of one embodiment of the method according to the invention.

In FIG. 1 a schematic flow diagram of one exemplary embodiment of the invention is shown.

In a first step 100 used fabric such as textiles and/or cloth are collected. In the following the term fabric includes but is not limited to used textiles, fabric or textile remnants from industrial manufacturing, cloth from a collection facility or a textile store, particularly a second-hand apparel store, a textile collection container, events or the like. Fabric can be collected from private households or delivered by commercial, industrial or private entities. Curtains, textile sheets and/or upholstery provide a suitable fabric, too.

The fabric comprises at least partially woven, knitted or otherwise connected fabric fibers. The fabric can be made of a variety of different fibers, such as natural fibers like wool, cotton, silk, rayon, denim or other natural animal or plant-based fibers.

Also, the fabric might comprise synthetic fibers such as Elastane, Polyester, Viscose, Nylon or other synthetic fibers. Synthetic fibers are particularly fibers that contain a polymer, particularly wherein said polymer is made from fossil oils.

In a second step 200, the collected fabric is sorted based on its predominant color or color grain or scheme or a brightness of color. Sorting might be done manually or automatically, for example by means of a video-based analysis detection device, comprising a camera in operational connection with a computer that is configured to detect separate fabric pieces and categorize the fabric pieces into at least two categories of color. Alternatively, the fabric pieces might be provided already sorted according to their color from the collection facility.

A sorting device that is operationally connected to the detection device comprises mechanical sorting elements that are configured to sort the categorized fabric pieces into the at least two categories, wherein for each category a separate container or processing lane is provided into which the categorized fabric pieces are sorted. Similarly, in case sorting is performed manually by human workers, the fabric pieces are sorted based on the category into the at least two containers or processing lanes.

The sorted fabric is then provided to a fine grinding device or fine milling device that is configured and adapted to pulverize 300 the fabric into small fabric particles, wherein an average particle size is smaller than or equal to 0.5 mm in diameter.

The fine grinding device might be specialized grinding mill. The fine grinding device according to this exemplary embodiment is configured to also mill or separate non-fiber compounds from the fabric. Non-fiber compounds might be a metal, a ceramics or stone. Polymer based appliances such as plastic zippers or buttons, as well as printed surfaces of the fabric are not considered as non-fiber compounds but might be milled by the fine grinding device into the fabric particles as well. The result is a powder-like substance or a powder that comprises also the non-fiber compounds, particularly wherein said compounds might not be milled to such a fine degree, but certainly can depending on their hardness.

The non-fiber compounds are then separated 300 from the powder by means of a suitable separating process that is known in the art. Such process for example can comprise an air blow selection process that separates the fiber particles from the non-fiber compounds by means of an air flow that blows the lighter fabric particles away from the non-fiber compounds that drop into a collection container for further recycling or sorting purposes.

Additionally or alternatively, magnetic metal particles can be separated from the fabric particles by means of a magneto-selective separation process. Said selection process pulls or pushes the magnetic particles out of the fabric powder by means of a magnetic field to which the powder is exposed.

Once the powder is separated from the non-fiber compounds the powder is provided to a pelletizer that is configured to pelletize 500 the powder of fabric particles into pellets. This is achieved by adding a binder, such as pure water, to the powder and apply an increased atmospheric pressure to the binder and the powder.

It is noted that it is sought to add only minimal amounts of water the powder such that the resulting pellets appear to be dry, i.e. they are not wet. The pelletizing step is a crucial step for increasing efficiency of the recycling process according to the invention, as on the one hand it reduces the volume of the powder significantly, which allows less complex handling during the down-stream processing steps and on the other hand it allows for the fabric particles to be stored and transported without the need of extensive volume requirements. Moreover, as the particles are particularly small, generation and exposure of fine dust that might be harmful, is avoided to great extent. Further processing steps of the method can be then performed without additional health precautions particularly according to ATEX certifications, such as wearing of face masks.

Typically per kilogram of powder 100 milliliters of water are added for forming the pellets.

Also, in form of pellets, a weight estimation is greatly simplified as compared to weighting process of powder, that tends to stick and dust off during such processes.

Therefore, processing speed of the method is increased by forming the pellets of fabric particles.

Apart from the added water, no additional substances are mixed to the fabric particles, which renders the method environmentally friendly.

In a subsequent step 600 of the exemplary embodiment of the invention, a mixture of the fabric pellets and a plastic compound is prepared.

The plastic compound is provided to the mixture in form of pellets as well. Suitable plastic compounds are for example, bioplastic compounds comprising or consisting of PLA, PHA, or PBS or a mixture thereof. Alternatively or in addition the plastic compound comprises low temperature processing thermoplastics, such as PET and/or a polyolefin, such as Polyethylene, Polypropylene. It is possible to mix plastic compound pellets of different compositions, such that the resulting plastic granule has selected properties depending on the intended use of the resulting plastic granule.

In addition, though optional, a color agent is added 610 to the mixture. The color agent might be granulated scallop shells, and/or grape seeds. Other color agents can be used, preferably color agents that are made from degradable natural products that might be collected as waste or remnant from corresponding facilities that process these products. The addition of the color agent allows to determine a resulting color of the plastic pellets that are to be formed at the end of the recycling process.

The mixture is then provided to an extruder where it is heated 700 to a degree that the plastic compound melts and wherein the temperature is only so high that natural fibers of the fabric particles do not burn or degrade. During heating synthetic components of the fabric particles might melt as well, but this is not a prerequisite of the melting process. The melted mixture is mixed to a degree that a homogenous or semi-homogenous material consisting of the fabric particles, the plastic compound and optionally the color agent is obtained. This material is then extruded 800 to plastic granule as a final product.

Said plastic granule can then be further processed 900 by means of an injection molding process or an additive manufacturing process or other plastic granule processing processes that require plastic granule for producing objects. Objects that are for example produced and used in luggage industry (suitcases, boxes), goggles, clothing hangers, packaging, headphones, furniture, automotive, building industry, computer and electronics industries and so on.

It is noted that the plastic granule produced by the method according to the invention can be processed like any other conventional plastic granule, which particularly in comparison to other recycling methods ion the art grants an nearly unlimited use of said plastic granule, as no modification has to be made and no precaution has to be taken in order to further process said plastic granule with conventional plastic granule processing devices.

In the following a table disclosing exemplary but not limiting fabric compositions that can be processed according to the method of invention is shown.

TABLE 1

| Fabric composition | | | |
| --- | --- | --- | --- |
| Fabric 1 | 50% cotton | 50% polyester | |
| Fabric 2 | 10% cotton | 90% polyester | |
| Fabric 3 | 10% Elastan | 90% polyester | |
| Fabric 4 | 10% viscose | 90% polyester | |
| Fabric 5 | 80% cotton | 20% polyester | |
| Fabric 6 | 100% cotton | | |
| Fabric 7 | 100% linen | | |
| Fabric 8 | 40% cotton | 40% polyester | 20% viscose |

TABLE 2

| Mixture composition | | |
| --- | --- | --- |
| Fabric pellets | Plastic pellets | Color agent |
| 50% (wt) | 45% (wt) | 5% (wt) (granulated scallops shell) |

TABLE 2-continued

| Mixture composition | | |
|---|---|---|
| Fabric pellets | Plastic pellets | Color agent |
| 20% (wt) | 70% (wt) | 10% (wt) (granulated grape seeds) |
| 10% (wt) | 80% (wt) | 10% (wt) |

The method according to the invention only uses approx. 67 kg CO2e-(CO2 equivalent) per 1000 kg fabric, wherein in comparison sending 1000 kg of clothes to a landfill produces 445 kg CO2e-(CO2 equivalent). Therefore, the method according to the invention, saves around 85% of CO2 equivalent emissions by recycling the fabric according to the method of the invention, while keeping the fabric waste out of landfill and incineration.

Another advantage of the method according to the invention, is that no chemical processing steps are necessary for producing the plastic pellets.

Figure 2:
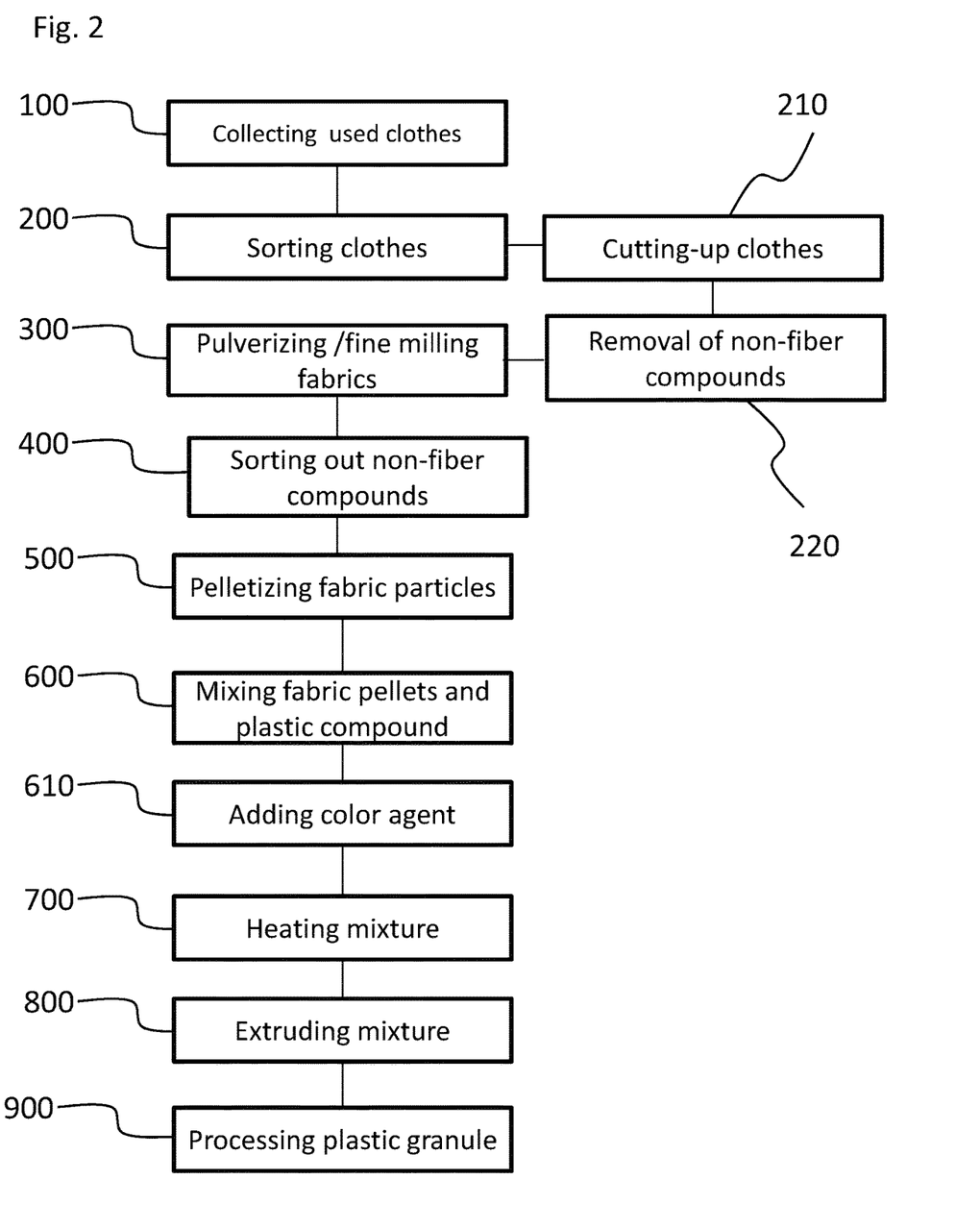
FIG. 2 shows a flow diagram of another embodiment of the method according to the invention.

FIG. 2 shows another embodiment of the invention. The process is essentially identical to the process as laid out in FIG. 1. Therefore, method steps having the same reference sign might not be elaborated again but the reader is referred to the corresponding paragraph of the description for FIG. 1.

In contrast to the embodiment depicted in FIG. 1, the method shown in FIG. 2 comprises an additional pre-shredding step 210 and a non-fiber compound removal step 220 prior to the pulverization step 300. This allows for a the use of fine grinding or fine milling device in the pulverization step 300 that are sensitive to the non-fiber compounds and might be damaged by such hard compound, like metal or stone.

The pre-shredding step 210 might cut the fabrics into pieces of larger size that can be sorted in an automatic sorting process as described previously. However, the pieces of fabric are larger than the pulverized fabric particles, for example in the range of several square millimeters to several square centimeters.

Removal of non-fiber compounds can be done manually from the fabric pieces and/or by means of automatic processes, such as a sieving process, a magnetic sorting process or a gravity-based sorting process, where heavy non-.fiber compounds fall down or settle faster than the fiber pieces, such that a separation by a wind or airflow is becomes possible.

This embodiment allows for the use of a mill or shredding device that is tolerant against the non-fiber compounds in the fabric, but that might not be able to pulverize the fabric to the fabric particles.

After the removal of the non-fiber compounds 220, the fine milling 300 can take place in order to arrive at the fabric particles for further processing. The fine grinding device might not be tolerant to large non-fiber compounds, but might be more efficient in pulverization of fabrics.

Figure 3:
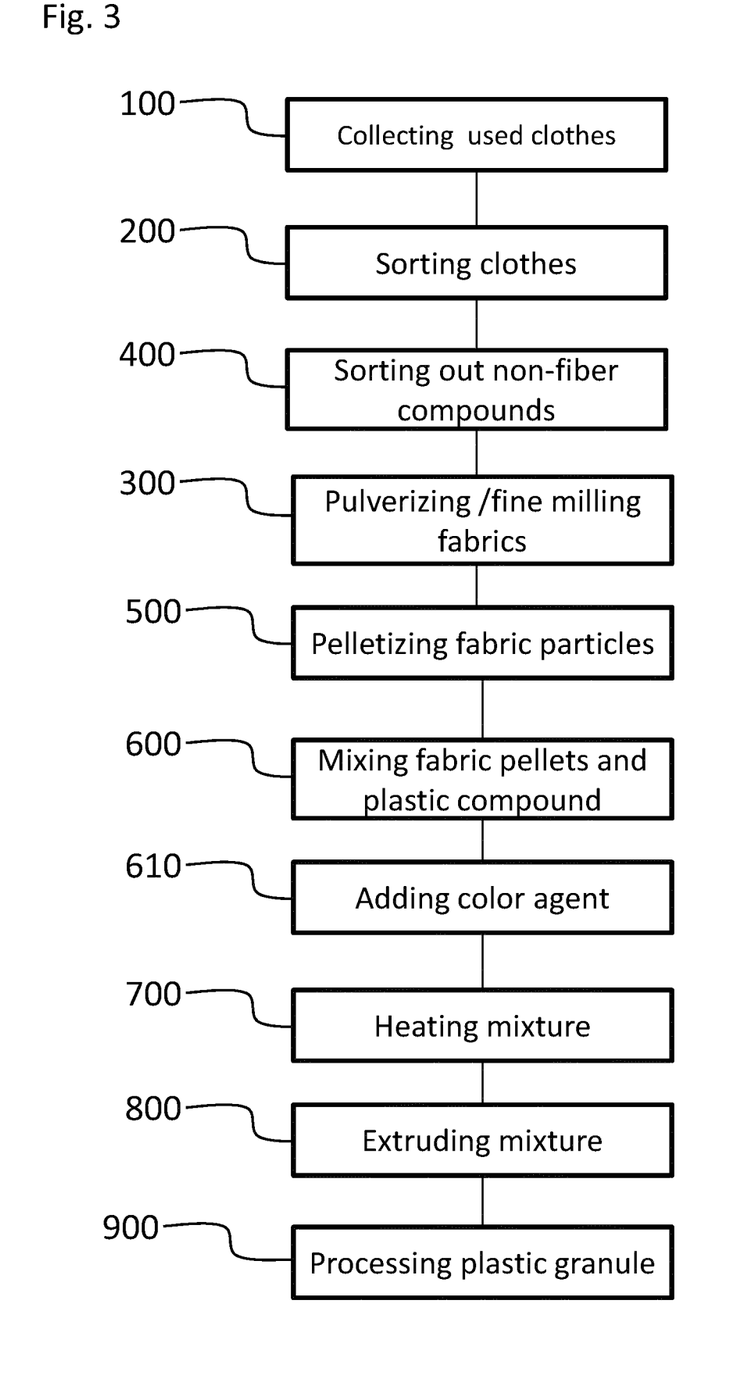
FIG. 3 shows a flow diagram of another embodiment of the method according to the invention.

In FIG. 3 another embodiment of the invention is shown. Reference is made to the steps and features explained in FIGS. 1 and 2. In contrast to the embodiment of FIG. 1 the non-fiber compounds are sorted out or removed 400 prior to the pulverizing step 300.

The sorting or removal 400 can be facilitated by cutting out non-fiber compound comprising portions from the fabric either manually or automatically.

This allows the use of a fine grinding mill that might not be tolerant to non-fiber compounds straight forwardly. In contrast to the embodiment of FIG. 2 no additional pre-shredding step is required.

LIST OF REFERENCE SIGNS

100 Collecting fabrics
200 Sorting fabrics
210 Pre-shredding fabrics
220 Removing non-fiber compounds
300 Pulverizing/Fine milling fabrics
400 Sorting out non fiber compounds and components
500 Pelletizing fabric powder
600 Mixing fabric pellets and plastic pellets
610 Adding color agent
700 Heating the mixture
800 Extruding mixture
900 Processing further with an injection molding or an additive manufacturing method.

The invention claimed is:

1. A method for recycling fabric into plastic granule for plastic manufacturing processes, the method comprising the steps of:
   a) Collecting fabric comprising fabric fibers
   b) Pulverizing the fabric into a powder of fabric particles
   c) Pelletizing the powder with a binder employing a compaction pelletizing process, such that fabric pellets comprising the powder of fabrics are formed
   d) Extruding a mixture of the fabric pellets and a plastic compound into plastic granule,
   characterized in that the mixture comprises at least 5% (wt) of the fabric particles.

2. The method according to claim 1, wherein the fabric comprises natural fibers and/or wherein the fabric comprises synthetic fibers.

3. The method according to claim 1, wherein the fabric comprises 100% synthetic fibers.

4. The method according to claim 1, wherein the fabric comprises fabric fibers or a mixture of fibers comprising:
   cotton,
   denim,
   wool,
   hemp,
   silk,
   Linen
   rayon,
   viscose,
   elastane, and/or
   polyester.

5. The method according to claim 1, wherein the binder comprises or consists of water.

6. The method according to claim 1, wherein the plastic compound is provided in form of pellets or granule to the mixture.

7. The method according to claim 1, wherein the plastic compound is a bioplastic compound comprising or consisting of polylactid acid (PLA), polyhydroxyalkanoates (PHA), or polybutylene succinate (PBS), or a mixture thereof.

8. The method according to claim 1, wherein the plastic compound comprises low temperature processing thermoplastics and/or a polyolefin.

9. The method according to claim 1, wherein the fabric comprises fabric of a selected color or a selected color composition only, such that a color of the extruded plastic granule is determined by the selected color or the selected color composition.

10. The method according to claim 1, wherein a color agent is added to the mixture, wherein the color agent is a dry organic waste made from natural products such that the granule has a predefined color, and/or wherein the color agent is selected from the group consisting of:
- granulated scallop shells,
- grape seeds,
- mussels,
- oysters,
- cork,
- algae,
- wood shavings.

11. The method according to claim 1, wherein the mixture comprises up to 50% (wt) of the fabric pellets.

12. The method according to claim 1, wherein the mixture consists of the fabric pellets and the plastic compound and —in case the mixture comprises the color agent —the color agent.

13. The method according to claim 1, wherein the plastic granule is injection molded, extrusion molded, injection stretch blow molded or additive manufactured into a recycled plastic object comprising the fabric particles.

14. The method according to claim 1, wherein for extrusion the mixture is heated such that the plastic compound melts and a homogenous or semi homogenous material of the fabric particles and the plastic compound is formed.

15. The method according to claim 1, wherein the mixture is heated to a melting temperature for extrusion such that the plastic compound melts, wherein a melting temperature of the mixture is below a pyrolysis or an oxidation temperature of the fabric particles.

16. The method according to claim 1, wherein the binder comprises water and the binder comprises sugar and/or roux.

* * * * *